US008930609B2

(12) United States Patent
Natu et al.

(10) Patent No.: US 8,930,609 B2
(45) Date of Patent: Jan. 6, 2015

(54) METHOD, APPARATUS, AND SYSTEM FOR MANAGEABILITY AND SECURE ROUTING AND ENDPOINT ACCESS

(75) Inventors: Mahesh Natu, Sunnyvale, CA (US); Eric J. Dahlen, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 12/806,643

(22) Filed: Aug. 18, 2010

(65) Prior Publication Data
US 2012/0047309 A1 Feb. 23, 2012

(51) Int. Cl.
*G06F 13/36* (2006.01)
*H04L 29/06* (2006.01)
*G06F 13/40* (2006.01)

(52) U.S. Cl.
CPC .......... *H04L 63/101* (2013.01); *G06F 13/4027* (2013.01)
USPC ....................................................... 710/315

(58) Field of Classification Search
CPC .......................... H04L 63/101; G06F 13/4027
USPC ............ 710/305, 306, 314; 726/2, 21, 26, 27, 726/30
See application file for complete search history.

(56) References Cited

U.S. PATENT DOCUMENTS

| | | | | |
|---|---|---|---|---|
| 7,454,554 | B1 * | 11/2008 | Norrie et al. | 710/316 |
| 7,650,645 | B1 * | 1/2010 | Langendorf et al. | 726/27 |
| 7,779,275 | B2 * | 8/2010 | Thornton et al. | 713/194 |
| 7,886,335 | B1 * | 2/2011 | Chickering et al. | 726/1 |
| 7,971,261 | B2 * | 6/2011 | Pestoni | 726/27 |
| 8,103,810 | B2 * | 1/2012 | Brown et al. | 710/62 |
| 8,132,226 | B1 * | 3/2012 | Bianco et al. | 726/1 |
| 8,205,240 | B2 * | 6/2012 | Ansari et al. | 726/1 |
| 8,230,149 | B1 * | 7/2012 | Long et al. | 710/305 |
| 2006/0143716 | A1 * | 6/2006 | Ikemoto | 726/27 |
| 2008/0235363 | A1 | 9/2008 | Shah | |
| 2009/0083760 | A1 | 3/2009 | Slaight | |
| 2009/0307719 | A1 | 12/2009 | Clark et al. | |
| 2013/0346666 | A1 * | 12/2013 | Chang et al. | 710/313 |

FOREIGN PATENT DOCUMENTS

WO 2012/024055 A2 2/2012

OTHER PUBLICATIONS

Management Component Transport Protocol (MCTP) Host Interface Specification, Date: Jul. 21, 2010, Version: 1.0.0, 19 pages.*
Management Component Transport Protocol (MCTP) Base Specification Version 1.1.0 Apr. 22, 2010.*
Managment Component Transport Protocol (MCTP), Tom Slaight Dec. 3-6, 2007.*
"Management Component Transport Protocol (MCTP) PCIe VDM Transport Binding Specification", DMTF Standard Specification, DSP0238, Version 1.0.1, Dec. 11, 2009, pp. 1-19.
International Search Report and Written Opinion received for PCT Patent Application No. PCT/US2011/045029, mailed on Feb. 9, 2012, 10 pages.

* cited by examiner

*Primary Examiner* — Paul R Myers
(74) *Attorney, Agent, or Firm* — Blakely, Sokoloff, Taylor & Zafman LLP

(57) ABSTRACT

A solution is presented to securing endpoints without the need for a separate bus or communication path. The solution allows for controlling access to endpoints by utilizing a management protocol by overlapping with existing interconnect communication paths in a packet format and utilizing a PCI address BDF (Bus number, Device number, and Function number) for verification.

24 Claims, 5 Drawing Sheets

BUS RENUMBERING FLOW

METHOD, APPARATUS, AND SYSTEM FOR MANAGEABILITY AND SECURE ROUTING AND ENDPOINT ACCESS

A spoofing attack is a situation in which one person or program successfully masquerades as another by falsifying the identifier and thereby gains unauthorized access to privileged resource. For example, an attacker can spoof email address belonging to a banking institution and trick the recipients into installing a rogue program. Similarly, an attacker can use DNS cache poisoning to redirect bank web site accesses to another server under control of the attacker. The attack server can capture user confidential information such as user name and passwords. These attacks are not specific to the Internet, but are found in all networks. These network systems must provide adequate protection against spoofing attacks and disclosure of confidential information.

The Management Component Transport Protocol (MCTP) is a protocol defined by the DMTF Platform Management Component Intercommunications sub-team of the DMTF Pre-OS Workgroup. MCTP is designed to support communications between different intelligent hardware components that make up a platform management subsystem that is provides monitoring and control functions inside a managed system. Various implementations of MCTP communication across a given medium are defined by companion transport binding specifications, such as, over PCIe and over SMBus/I²C. Since MCTP involves multiple entities communicating with each other, it is effectively a networked system. Therefore, MCTP needs to provide protections against spoofing and information disclosure in a manner that is a scalable hardware solution.

There are several manageability applications that require high bandwidth and low latency communication between various components. For example, media redirection and video redirection. Current solutions for the manageability applications include, a fast sideband bus likes RMII or an internal bus. Unfortunately, a dedicated sideband bus increases component costs due to more pins and limits motherboard placement options. Alternatively, internal busses limit mix and match and prevent Media redirection using a discrete LAN or discrete graphics component.

DETAILED DESCRIPTION

Figure 1:
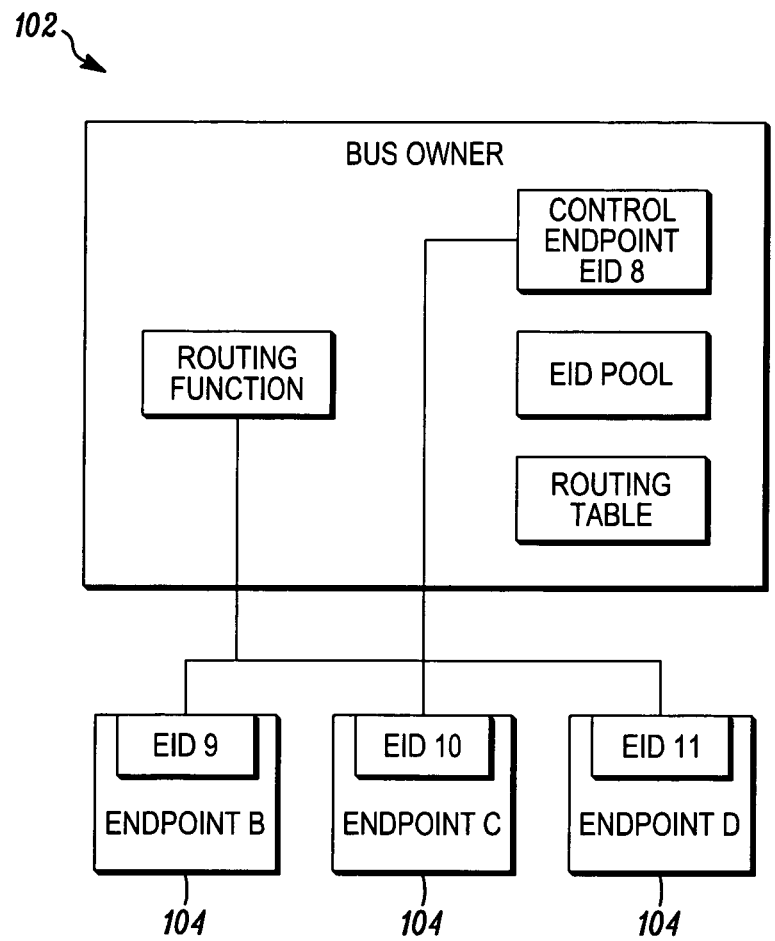
FIG. 1 is a logical view of an apparatus for a bus owner to maintain endpoints in accordance with one embodiment of the claimed subject matter.

As previously discussed, present manageability applications require a fast sideband bus like RMII or an internal bus is used to meet these needs. Unfortunately, a dedicated sideband bus increases component costs due to more pins and limits motherboard placement options. Alternatively, internal busses limit mix and match and prevent Media redirection using a discrete LAN or discrete graphics component.

The Management Component Transport Protocol (MCTP) defines a communication model intended to facilitate communication between management controllers and other management controllers and between management controllers and management devices. This communication model includes a message format, transport description, message exchange patterns, and configuration and initialization messages. When MCTP is transported over PCI Express (MCTP over PCIe), it address the issues stated in the previous paragraph.

As previously discussed, a need exists to incorporate MCTP over companion transport binding specifications in a manner that increases security and is a scalable hardware solution.

The following description and embodiments allow for implementation in hardware in case some of the MCTP endpoints might not contain any firmware. Furthermore, the following descriptions and embodiments allow for a scalable solution for different market segments and are compatible with the existing MCTP standard.

In one embodiment, the claimed subject matter utilizes the PCI address BDF (Bus number, Device number, and Function number) for verification. In other embodiments, MCTP Endpoint ID (EID) can be used for verification. Under PCI and PCI Express architecture, each PCI Express endpoint is identified with a unique address that comprises of a PCI Bus number, PCI Device number and PCI Function number. These are referred to as the BDF. To further articulate and explain BDF, PCI/PCIe has the concept of PCI configuration Space. Each PCI express device contains number of registers that needs to be configured for the device to work. These registers are mapped in PCI configuration space. Individual devices are assigned a unique BDF. The host software can address each device separately using BDF. For example, bus 2, device 0, function 0 may be assigned to a NIC card and bus 3, device 0, function 0 may be assigned to the storage controller.

In one embodiment, MCTP endpoints may be designated into two classes, Privileged MCTP Endpoint (PME) and Service Provider MCTP Endpoint (SPME) for the purpose of discussing applications for security analysis. In one embodiment, the PMEs may be allowed to access privileged services (e.g. storage configuration) from Service Provider MCTP Endpoints (SPME) and are privy to sensitive (confidential) data. Some examples of PMEs could be a trusted embedded controller, such as a management engine (ME) in a client or ME/BMC in servers. In one embodiment, other manageability controllers may take the role of PME.

In contrast, SPMEs could be a Network Interface Card (NIC), graphics controller, a storage controller, a Central Processing Unit (CPU). In one embodiment, SPMEs that fulfill sensitive requests need assurance that the request is in fact coming from a PME and that confidential data sent back is not redirected to a rogue endpoint.

In one embodiment for a configuration, there is one or more Privileged MCTP Endpoints (PME) that is allowed to access the services from several Service Provider MCTP Endpoints (SPME). For example, BMC and a trusted embedded controller (ME for one embodiment) are the privileged entities that access services from Network and Storage Controllers via MCTP. Furthermore in some embodiments, a trusted embedded controller needs to access services from Network and Graphics Controllers. In addition, the privileged entities may sometimes play a role of service provider. For example, the trusted embedded controller may provide services to BMC in some configurations. Some of the services provided over MCTP may be benign (e.g. endpoint discovery), while some may be sensitive (e.g. read disk contents, capture screen etc.). The service provider that fulfils sensitive request needs an assurance that the request is in fact coming from PME.

In summary, the following embodiments utilize some or all of the following elements. In one embodiment, every SPME that provides security sensitive services maintains a Access Control List (ACL) consisting of PME PCI BDFs. SPME will compare the Requestor BDF field in MCTP packets against ACL, for every security sensitive service request.

Also, in one embodiment, each PCI Express Root Port and Switch Port in a processors and/or a chipset contain Address Validation Filter (AVF) logic that prevents rogue endpoints from spoofing PME BDFs. PCI Express Root ports and Switch Ports will compare the BDF fields in MCTP packets against this Address Validation List (AVL) for every request. In one embodiment, PCI Express Root Port and Switch Ports in a processors and/or a chipset also prevents traffic intended for PMEs from being redirected to rogue endpoints. Also, in another embodiment, a system on chip (SoC) implements the PCI Express Root Port and Switch Ports. Also, in one embodiment, the SoC supports external PCI Express slots or discrete devices.

In one embodiment, the ACL and AVL may be implemented in hardware registers that are programmable by a trusted embedded controller. In one embodiment, the trusted embedded controller is a management engine (ME).

In some embodiments, this solution can extended to handle cases where PME needs assurance that the response came from the intended SPME. This can be achieved by ensuring SPME PCI BDFs cannot be spoofed. This solution can also be extended to handle PMEs with various multiple privilege levels.

FIG. 1 is a logical view of an apparatus for a bus owner to maintain endpoints in accordance with one embodiment of the claimed subject matter. In one embodiment, the bus owner 102 manages the other endpoints 304 and is responsible for MCTP endpoint discovery and for assigning MCTP endpoint ids. For example, in this figure, endpoint ids 9, 10, and 11 are assigned to endpoints B, C, and D, respectively. Also, the MCTP bus owner is an endpoint id of 8. In one embodiment, the endpoints could be NICs, Graphics controllers (GFX), Storage controllers, etc.

In one embodiment, the bus owner 102 may be a MCTP bus owner with a fixed PCIe address and is accessed via a route to root complex PCIe routing type.

Under MCTP architecture, the bus owner maintains the current MCTP EID to PCIe BDF number mapping. Also, endpoints can request Bus Owner to provide PCIe BDF for a given EID. Consequently, Endpoint can then use PCIe Bus/Device/Function number to communicate directly with the other Endpoint.

Figure 2:
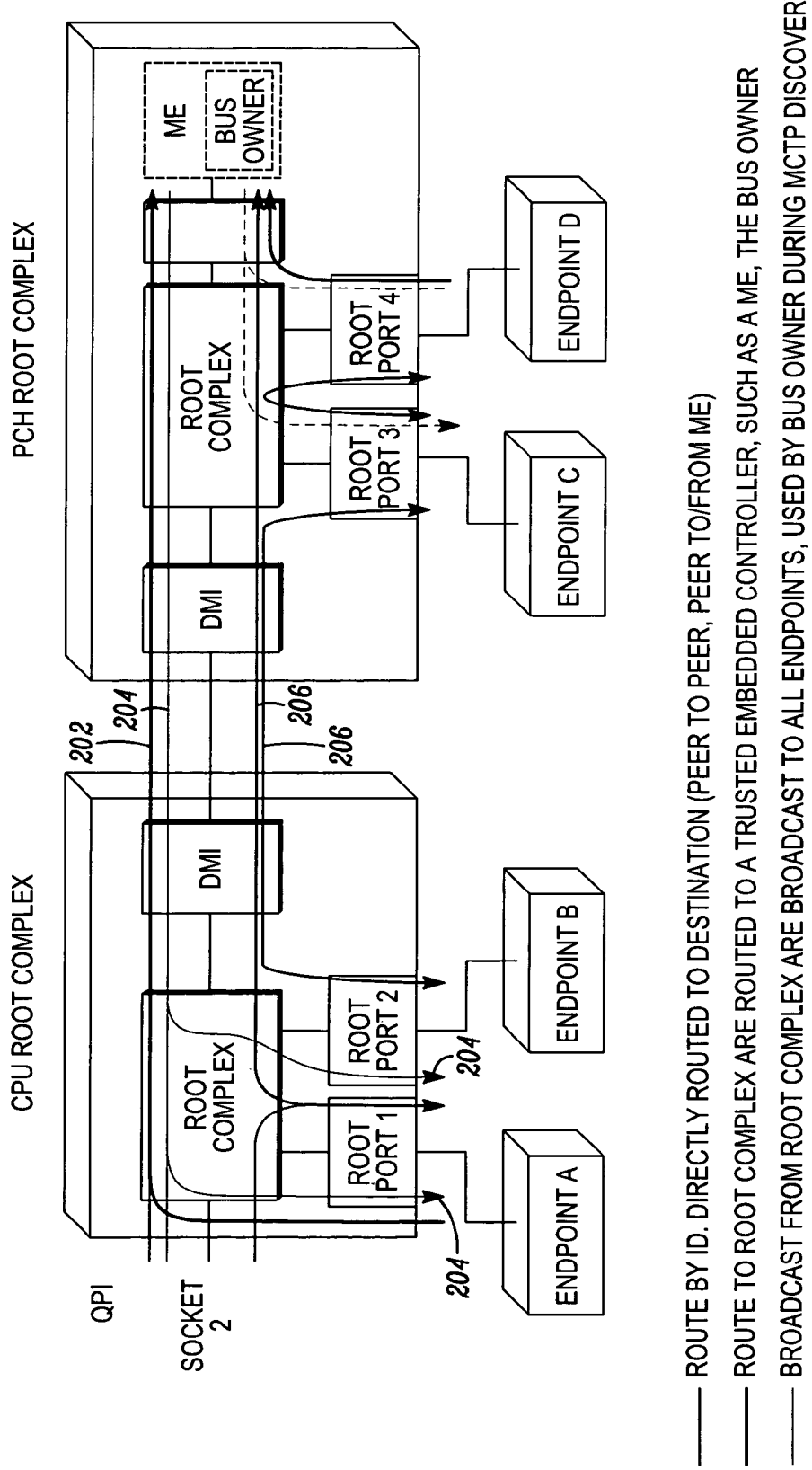
FIG. 2 is a flow of messages within an apparatus in accordance with one embodiment of the claimed subject matter.

FIG. 2 is a flow of messages within an apparatus in accordance with one embodiment of the claimed subject matter. Each of the labels indicates the message flow and the particular routing. For example, in one embodiment, the message flow 202 is a route to root complex type that is routed to the trusted embedded controller, such as a ME in one embodiment, and bus owner within the PCH root complex.

In this figure, a CPU root complex is connected to a PCH Root complex via a direct media interface (DMI) interconnect. However, the claimed subject matter is not limited to a DMI interconnect or CPU to PCH root complex combination.

Also, in one embodiment, all MCTP VDM traffic is directed through a PCIe Root port and/or Switch port before it reaches a peer endpoint. In one embodiment, the endpoints could be Network Interface Cards (NIC), Graphics controllers (GFX), Storage controllers, etc.

In one embodiment, each Endpoint and Port is accessible at its own Bus, Device, Function (BDF). Also, Bus Decoder Registers are present in PCIe Port including Root Ports and Host PnP Software allocates bus numbers to Endpoints by configuring these registers. These decoders control routing of MCTP VDMs.

For example, in one embodiment, the message flow 204 is a Broadcast from Root Complex are broadcast to all endpoints and are used by Bus Owner during MCTP discovery. In yet another example, the message flow 206 is a Route by ID and is directly routed to the destination (Peer to Peer, Peer to/from a trusted embedded controller, such as, a ME).

Figure 3:
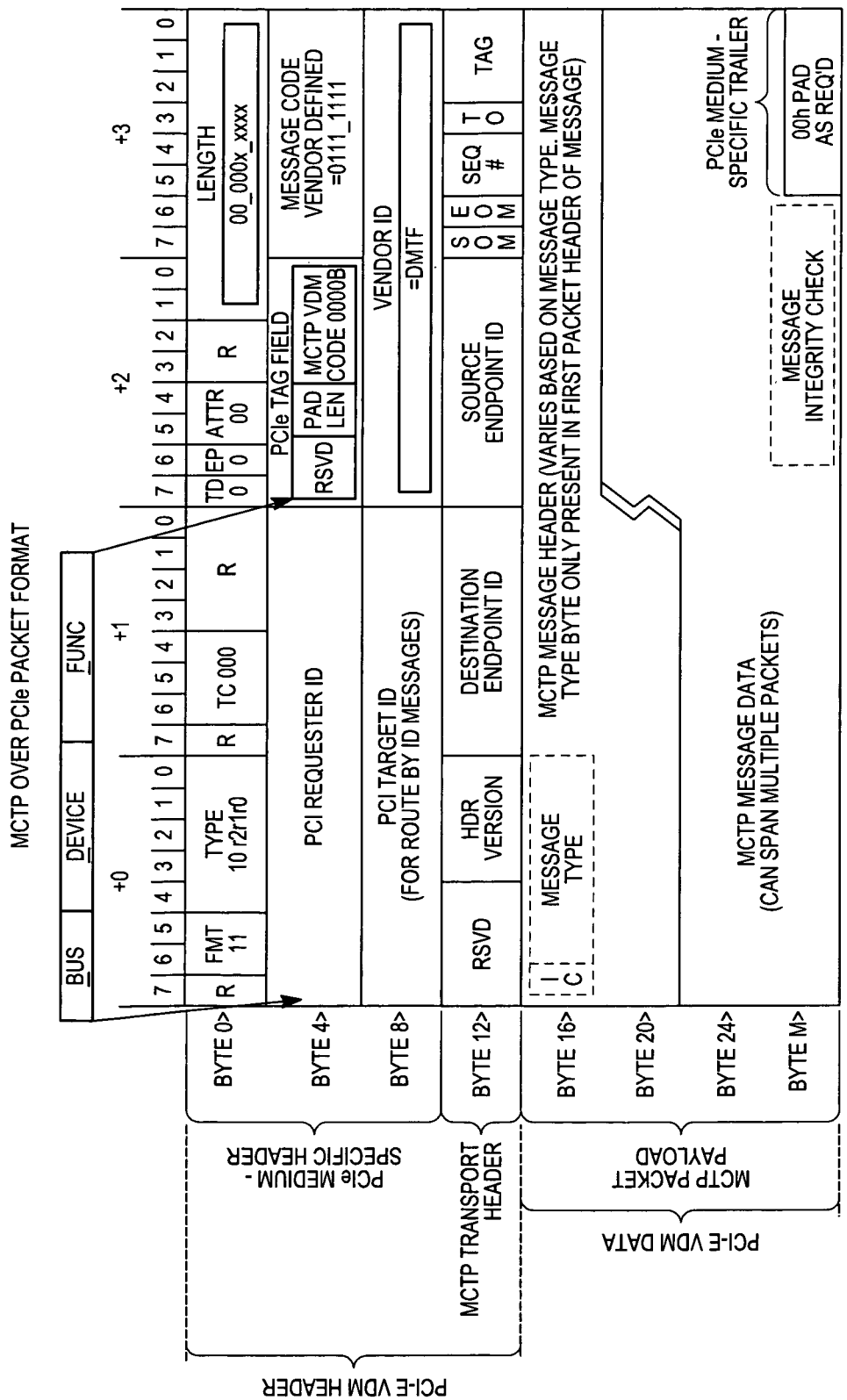
FIG. 3 is a packet format of transporting management information in an PCIe format in accordance with one embodiment of the claimed subject matter.

FIG. 3 is a packet format of transporting management information in an PCIe format in accordance with one embodiment of the claimed subject matter. In this packet format, the PCIe VDM header contains the PCI Bus, Device, Function (BDF) information for the requestor endpoint as well as the target endpoint. As previously mentioned, each endpoint and port is accessible at its own Bus, Device, Function (BDF) the bus owner maintains the current MCTP EID to PCIe Bus/Device/Function (BDF) number mapping.

Also, in this same embodiment, the PCIe VDM header contains the MCTP transport header. In contrast, the PCIe VDM data contains the MCTP packet payload that comprises the message type, the MCTP message header and data (and could span multiple packets).

Figure 4:
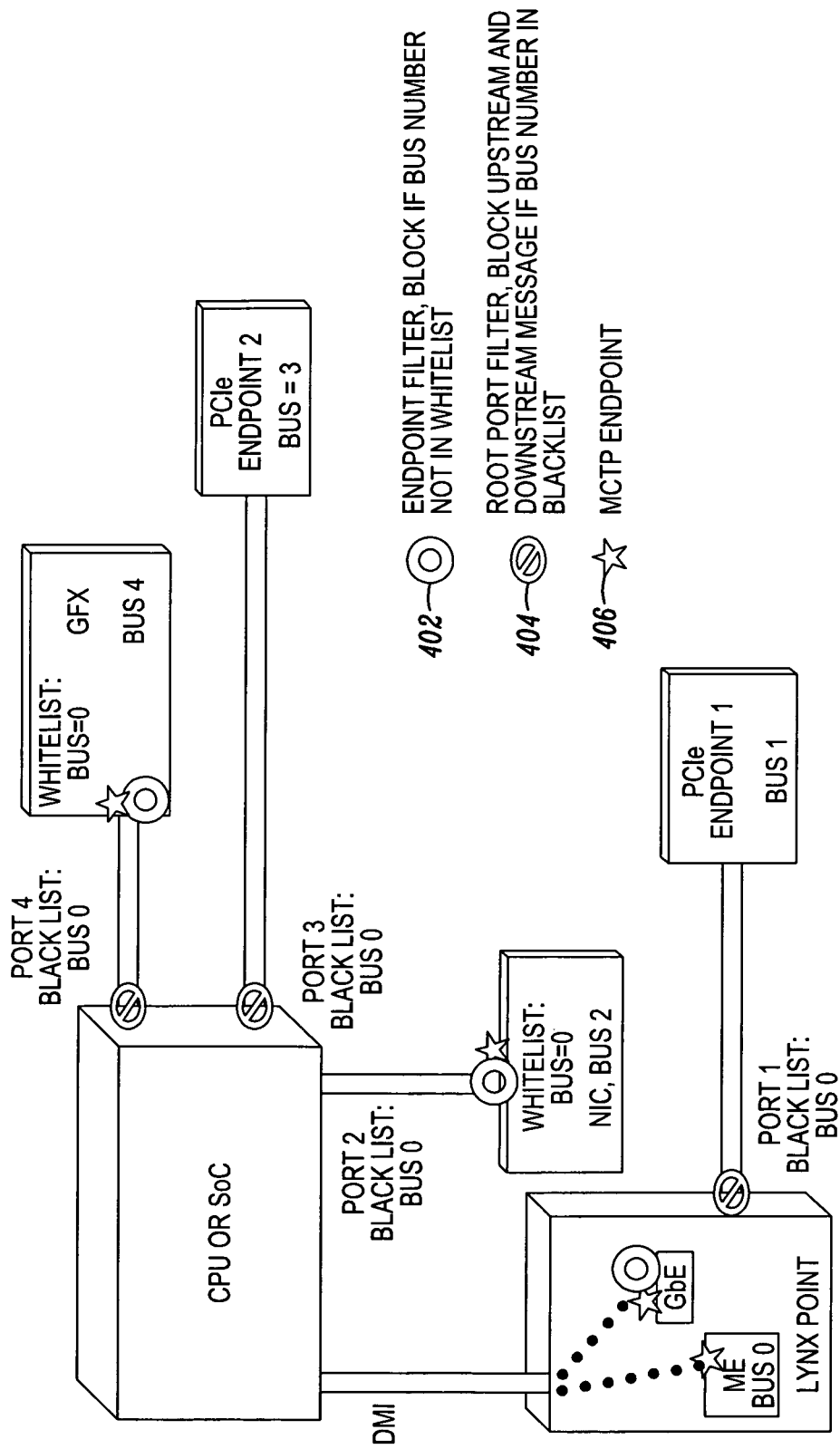
FIG. 4 is a system in accordance with one embodiment of the claimed subject matter.

FIG. 4 is a system in accordance with one embodiment of the claimed subject matter. As previously discussed, in one embodiment, every SPME that provides security sensitive services maintains ACL consisting of PME PCI BDFs. SPME will compare the Requestor BDF field (Bytes 4 and 5) in MCTP packets against this list, for every security sensitive service request. FIG. 4 shows the MCTP Vendor Defined Message (VDM) format. SPME can log unauthorized access requests in a status bit.

Also, in one embodiment, each PCI Express Root Port and Switch Ports in a processors and/or a chipset contain Address Validation Filter (AVF) logic that prevents rogue endpoints from spoofing PME BDFs. PCI Express Root ports and Switch Ports will compare the BDF fields in MCTP packets against this Address Validation List (AVL) for every request. AVF logic checks the PCI Requestor ID field (Bytes 4 and 5 in VDM header) on each upstream transaction against AVL to prevent rogue endpoints from spoofing PME BDF's. The Port shall inhibit the upstream MCTP transaction if the address is on the AVL. AVF logic checks the PCI Target ID field (Bytes 8 and 9 in VDM header) on each downstream transaction against AVL to prevent rogue endpoints from receiving traffic intended for PMEs. The Port shall inhibit the downstream MCTP transaction if the address is on the AVL.

In some embodiments, the silicon implementations of ACL and AVL may choose to perform partial decode i.e. decode bus number field alone in some market segments.

Also, PCI Express Root Ports and Switch Ports can optionally log spoofing attempts in a register. All MCTP VDM traffic is directed through a PCIe Root port and Switch Ports before it reaches a peer endpoint.

In one embodiment, the ACL and AVL may be implemented in hardware registers. A trusted embedded controller, such as a ME in one embodiment, is responsible for determining PME list and programming ACL and AVL via a secure mechanism. The secure path can take various form
(a) point to point link,—Point to point links are not vulnerable to spoofing.
(b) links that are internal to the component—These are shielded from external accesses and thus provide necessary protection, For example, ME can use links internal to the chipset for securely communicating with devices and Root Ports and Switch Ports integrated in the South Bridge.

(c) Protected proprietary VDMs—These can be protected using proprietary logic in the PCIe Root ports.

(d) MCTP VDMs originating from ME BDF—For this to work, the AVF will always block MCTP accesses originating from ME BDF. This will ensure that no external device can generate MCTP accesses with ME BDF.

ME can also examine unauthorized access attempts logged by Root Ports/Switch Ports/Endpoints and report those to higher level entity.

Specifically referring to FIG. 4, the high level summary for one embodiment facilitates maintaining AVF Logic and AVL to enable a the root port from preventing agents from spoofing ME address. Also, the NIC and/or GFX grants services if the address matches the trusted embedded controller, such as, a ME.

In one embodiment, the preceding description depicts the SPME maintaining an AVL and the root ports containing AVF to prevent rogue endpoints from spoofing PME Requestor IDs based on an AVL. Several implementations may be utilized for this claimed subject matter and are based at least in part on how dynamic features of the PME list. The following description describes three different implementations based on the type of PME list, such as, a static, boot time programmable, and runtime programmable.

In one embodiment, the PME list is a static PME list. For example, the ACL holds one requestor BDF, that for a trusted embedded controller, such as, a ME. As a result, the GFX controller will deny screen capture requests from other PCIe endpoints (bus 1 and bus 3). In one embodiment, a trusted embedded controller, such as, a ME is part of the PCI Express host bridge. Therefore, MCTP packets generated by ME will never pass through the PCIe Root Port in the upstream direction. FIG. 4 shows AVF in each Root Port that prevents PCIe endpoints from spoofing ME requestor ID. If the bus 1 endpoint attempts to generate an MCTP request with requestor BDF matching ME, the root port 1 in the south bridge will block that. ME must configure the AVL before it configures the ACL in GFX or NIC.

In another embodiment, the PME list is boot time programmable. For example, platforms that have more than one South Bridge and each South Bridge may have an instance of ME. The Requestor ID of the ME in secondary South Bridge will typically be programmable by BIOS at boot time. In such configuration, the PME lists will have to programmable. Primary ME can discover the presence of secondary ME, determine its bus number, lock the bus number and include that in ACL and AVLs.

To overcome the limitations of the prior art, the claimed subject matter prevents some operating systems from changing the bus number that is assigned to BMC using ACPI mechanisms. For example, BIOS can do that by declaring the root port upstream to BMC as a separate host bridge that has been allocated 1 bus. If the BMC bus number is pinned at boot time in this manner, ME can set up the PME list and thus ACLs/AVLs at boot time.

Since BMC's physical location and bus number may change from one platform to another, a trusted embedded controller, such as a ME, obtains this information from BMC. There are many ways to do this with varying degrees of complexity vs. security tradeoffs. In one current solution, the BMC is connected to ME via point to point SMBUS. BMC can use that point to point interface to communicate to ME which PCIe Root Port BMC is connected to. Alternately, BMC and ME can exchange this information over MCTP/PCIe securely using an encryption scheme. Since ME and BMC both contain firmware and enough MIPS, they will be able to encrypt the data inside this one packet every boot without much difficulty. Alternately, platform manufacturer can provide this information to ME via softstraps. Once ME knows the PCIe Root port that BMC is attached to, it can lock down the bus number fields in the root port to prevent malicious software from changing it. ME can then include BMC's BDS in AVL of all root ports, except the one above BMC. ME can also include BMC BDF in the various SPME ACLs. In some implementations, BMC can perform this activity as well.

Figure 5:
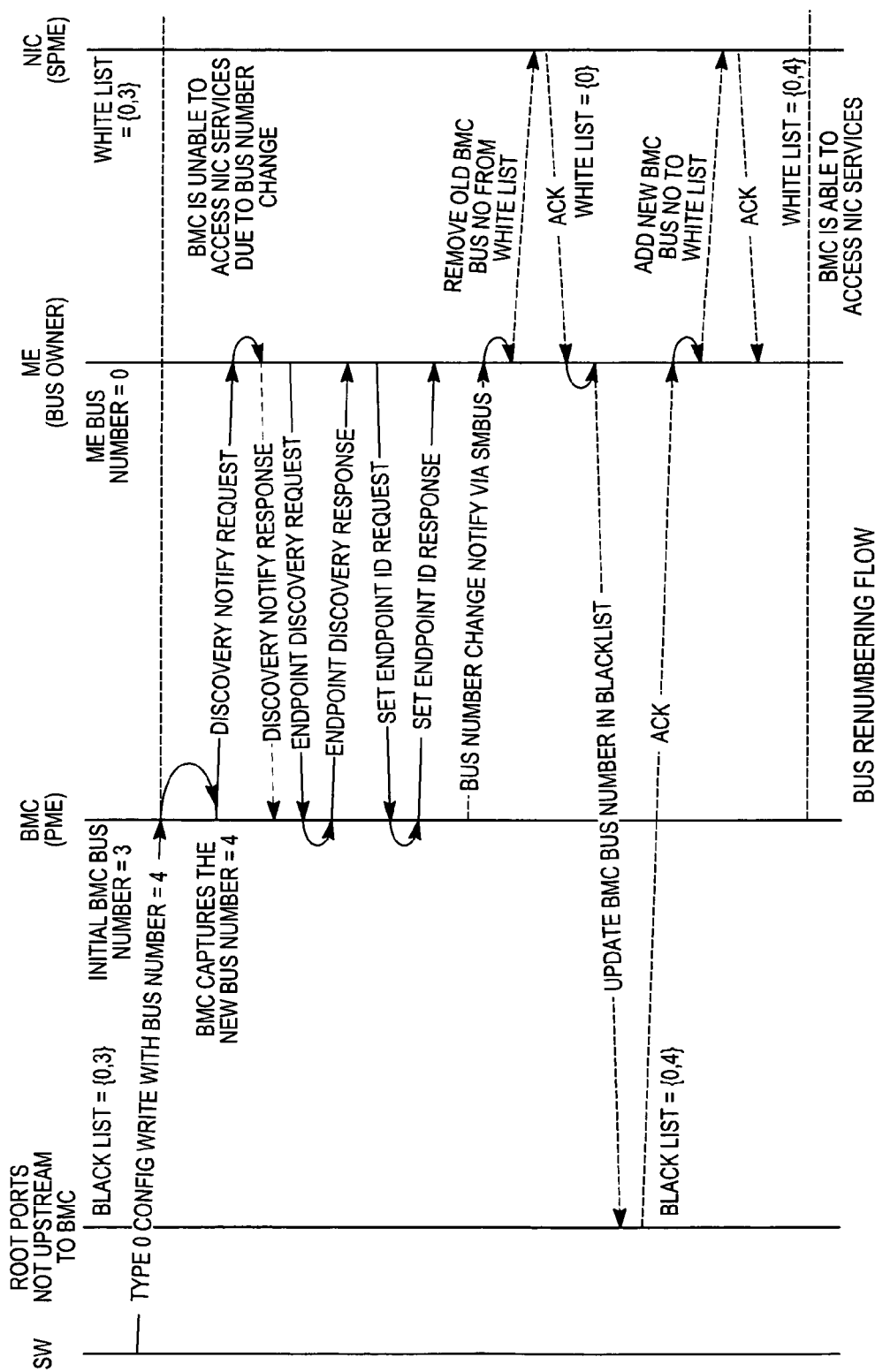
FIG. 5 is a method of a bus renumbering flow in accordance with one embodiment of the claimed subject matter.

FIG. 5 is a method of a bus renumbering flow in accordance with one embodiment of the claimed subject matter. In one embodiment, it depicts a runtime programmable PME list.

The example shows the case where BMC is the privileged endpoint. NIC is the SPME. At the beginning of the flow, BMC's bus number is 3. For simplicity, the ACL and AVF logics only look at the bus number field and ignore device/function numbers. Initially, the SPME is configured to service requests for bus numbers 0 (ME) and 3. All root ports except the one upstream to BMC are configured to block MCTP requests with source bus numbers 0 or 3. Dotted transitions represent steps that are introduced by this invention. Unbroken transitions represent standard steps during MCTP bus renumbering flow. In one embodiment, the method described above is applicable to bus number assignment at boot time as well as during runtime (OS renumbering or hot plug).

According to PCIe specification, the bus number of a PCIe endpoint is changed when the device sees a type 0 PCI configuration write with a new bus number. In this case, the SW has chosen to change BMC's bus number to 4. From this point on, BMC is unable to access MCTP services from NIC since NIC doesn't entertain requests from bus number 4. According to MCTP specification, the endpoints notify the Bus Owner about bus number change via Discovery_Notify message. The Bus owner initiates the MCTP discovery process during which it reprograms certain MCTP parameters. Subsequently, BMC is able to generate MCTP messages with correct IDs. Once MCTP renumbering flow is complete, BMC notifies the trusted embedded controller, such as a ME, about the bus number change via s trusted path. As explained earlier, the trusted path can be a point to point interface or encrypted message over MCTP. ME proceeds to remove old BMC bus number from NIC ACL and reprograms AVLs in all root ports except the one above BMC. The old BMC bus number (3) in the AVL is replaced with the new bus number (4). From this point on, no endpoint besides BMC, can generate MCTP requests with bus number of 4. ME adds new BMC bus number to NIC ACL, thereby restoring BMC access to NIC MCTP services.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in That is claimed is:

1. A method for managing a secure endpoint comprising:
defining a first class and a second class of Management Component Transport Protocol (MCTP) endpoints interconnected by one or more buses;
assigning a PCI Express configurable Bus number, a configurable Device number, and a configurable Function number (BDF) to the first class of MCTP endpoints;
verifying a request from a device of the first class of MCTP endpoints based at least in part on the device's BDF and an access control list maintained by the second class of MCTP endpoints, wherein the request is included in a PCI Express Vendor Defined Message (VDM) packet and the device's BDF is the VMD header's PCI Requestor ID.

2. The method of claim 1 wherein the first class of MCTP endpoints is a Privileged MCTP Endpoint (PME).

3. The method of claim 1 wherein the first class of MCTP endpoints is a Service Provider MCTP Endpoint (SPME).

4. The method of claim 1 further comprising maintaining an Address Validation List to prevent spoofing of the first class of MCTP endpoints.

5. The method of claim 1 wherein the first class of MCTP endpoints is a Baseboard Management Controller.

6. The method of claim 1 wherein the first class of MCTP endpoints is a trusted embedded controller.

7. The method of claim 1 wherein the second class of MCTP endpoints comprise one or more of a Network Interface Card, graphics controller, a storage controller, or a Central Processing Unit.

8. The method of claim 1 wherein the second class of MCTP endpoints is a graphics controller.

9. The method of claim 1 wherein the second class of MCTP endpoints is a storage controller.

10. The method of claim 1 wherein the second class of MCTP endpoints is a Central Processing Unit.

11. A logic circuit to manage secure endpoints comprising:
a decode circuit to receive a PCI Express Vendor Defined Message (VDM) packet including a Management Component Transport Protocol (MCTP) request from a first endpoint interconnected by one or more buses to a second endpoint and to decode VDM packet's header's PCI Requestor ID field of the packet that contains a configurable Bus number, a configurable Device number, and a configurable Function number (BDF); and
an enable circuit to allow the request to be processed based at least in part on the device's configurable BDF and a list of secure endpoints.

12. The logic circuit of claim 11 wherein the endpoint is a Baseboard Management Controller.

13. A method for managing a secure endpoint comprising:
defining a first class and a second class of Management Component Transport Protocol (MCTP) endpoints interconnected by one or more buses;
assigning a PCI Express configurable Bus number, configurable Device number, and configurable Function number (BDF) to the first class of MCTP endpoints;
verifying a request from a device of the first class of MCTP endpoints based at least in part on the device's configurable BDF and a configurable access control list maintained by the second class of MCTP endpoints, wherein the request is included in a PCI Express Vendor Defined Message (VDM) packet and the device's BDF is the VMD header's PCI Requestor ID.

14. The method of claim 13 further comprising maintaining an address validation list to prevent spoofing of the first class of MCTP endpoints.

15. The method of claim 13 wherein the configurable access control list is a static Privileged MCTP Endpoint (PME) list and contains a management engine BDF.

16. The method of claim 13 wherein the configurable access control list is a boot time programmable Privileged MCTP Endpoint (PME) list that has a Baseboard Management Controller (BMC) that may change the respective physical location and bus number from one platform to another and allows for a trusted embedded controller to obtain this information from the BMC.

17. The method of claim 13 wherein the configurable access control list is a runtime programmable Privileged MCTP Endpoint (PME) list that utilizes a bus renumbering flow to allow for runtime changes to the PME list.

18. The method of claim 14 wherein the address validation list is maintained by Address Validation Filter logic in a root port or switch port.

19. The method of claim 16 wherein the trusted embedded controller is a Management Engine (ME).

20. A method for managing a secure endpoint comprising:
defining a first class and a second class of Management Component Transport Protocol (MCTP) endpoints interconnected by one or more buses;
assigning a PCI Express configurable Bus number, a configurable Device number, and a configurable Function number (BDF) to the first class of MCTP endpoints;
verifying a request from a device of the first class of MCTP endpoints based at least in part on the device's BDF and a configurable access control list maintained by the second class of MCTP endpoints, wherein the request is included in a PCI Express Vendor Defined Message (VDM) packet and the device's BDF is the VMD header's PCI Requestor ID; and
maintaining an Address Validation List to prevent spoofing of the first class of MCTP endpoints.

21. The method of claim 20 wherein the address validation list is maintained by Address Validation Filter logic in a root port or switch port.

22. A system comprising:
a processor,
a first class and a second class of Management Component Transport Protocol (MCTP) endpoints interconnected by one or more buses and coupled to the processor, the first class of MCTP endpoints assigned a PCI Express configurable Bus number, a configurable Device number, and a configurable Function number (BDF);
an address validation filter logic, coupled to the processor, to verify a request from a device of the first class of MCTP endpoints based at least in part on the device's configurable BDF and a configurable access control list maintained by the second class of MCTP endpoints, wherein the request is a part of a PCI Express Vendor Defined Message (VDM) packet including a Management Component Transport Protocol (MCTP) header and payload and wherein the VDM packet's header includes the device's BDF as a PCI Requestor ID field.

23. The system of claim 22 wherein the address validation filter logic is in a root port.

24. The system of claim 22 wherein the address validation filter logic is in a switch port.

* * * * *